United States Patent
Upton et al.

[11] Patent Number: 6,167,024
[45] Date of Patent: Dec. 26, 2000

[54] MULTIPLE CHANNEL CONTROL USING ORTHOGONALLY MODULATED CODED DRIVE SIGNALS

[75] Inventors: Eric L. Upton, Redondo Beach; Michael G. Wickham, Rancho Palos Verdes; Martin P. Smith, Redondo Beach, all of Calif.

[73] Assignee: TRW Inc., Redondo Beach, Calif.

[21] Appl. No.: 09/042,928

[22] Filed: Mar. 17, 1998

[51] Int. Cl.[7] .................................................. H04B 7/216
[52] U.S. Cl. ........................................... 370/203; 370/208
[58] Field of Search ..................... 370/208, 209, 370/203, 249, 335, 342, 441; 375/140, 145, 146, 147, 149, 152, 143, 144

[56] References Cited

U.S. PATENT DOCUMENTS

| | | | |
|---|---|---|---|
| 5,414,699 | 5/1995 | Lee | 370/206 |
| 5,598,428 | 1/1997 | Sato | 375/206 |
| 5,687,162 | 11/1997 | Yoshida et al. | 370/203 |
| 5,694,388 | 12/1997 | Sawahashi et al. | 370/206 |
| 5,734,647 | 3/1998 | Yoshida et al. | 370/335 |
| 5,757,845 | 5/1998 | Fukawa et al. | 375/200 |

*Primary Examiner*—Ricky Ngo
*Attorney, Agent, or Firm*—Michael S. Yatsko

[57] ABSTRACT

An orthogonal pilot tone servo controller provides a servo control loop for each tap in a delay line processor where each servo acquires its independence from the other tap's servos utilizing an orthogonal code set modulated on top of the existing tap values. The orthogonal codes are attenuated in amplitude such that the code sets are transparent to the processed signals of interest, but the code's length enables each tap's servo controller to independently recover the tap's state from the aggregate of signals and codes through processing gain realized in each loop's recovery circuit. A plurality of taps can be thus be servo controlled simultaneously, providing for extremely wide bandwidth processes which can be performed accurately with digital controls.

35 Claims, 6 Drawing Sheets

MULTIPLE CHANNEL CONTROL USING ORTHOGONALLY MODULATED CODED DRIVE SIGNALS

BACKGROUND OF THE INVENTION

The present invention relates generally to control systems, and more particularly to signal processing devices that need servo control.

Rapid advances in technology, particularly optical communication systems, have accelerated the need for an accurate technique for controlling such systems. In particular, such systems typically include adaptive filters, such as finite-impulse-response (FIR) and infinite-impulse-response (IIR) filters, which advantageously can be programmed to a particular filter shape and are extensively used in signal processors. Processors including adaptive filters are particularly well suited for communications uses involving transmission paths (e.g., radio links) with time varying distortions and transmission paths (e.g., coaxial cables) which require processor adjustment in the field. Such processors provide large bandwidths, extreme flexibility and adaptiveness. In particular, an N-tap delay line FIR filter can be utilized to provide band pass, high pass, notch or low pass filtering by modifying its taps to track or accommodate, for instance, the profile of links, power distribution, intersymbol interference (ISI) and multipath characteristics which can change with time.

Adaptive filters have become powerful signal processing tools especially in large bandwidth applications, generally in the tens of gigahertz. Maintaining servo control, accuracy and stability over time for such filters, without a high degree of hardware complexity and sophistication is, however, critical. In particular, adaptive filters tend to suffer from control problems. For example, once set to a particular value, such filters have a tendency to drift. Conventional control systems for such filters, even if effective, tend to be complex and thus expensive and timely to manufacture.

Moreover, signal processing components, such as optical modulators, suffer from shortcomings as well. Stability over temperature, linearity and calibration is generally required to provide accurate coefficient values in modulators as directed by an external controller. For example, Bragg grating modulators, commonly utilized in fiber optic tapped delay line photonic signal processors, are susceptible to temperature expansion and thus tend to be inherently temperature unstable. In particular, a Bragg grating typically includes a series of photoinduced refractive index perturbations in an optical fiber or semiconductor which causes the reflection of optical signals within a selected wavelength band. The reflection bandwidth of a Bragg grating is however temperature sensitive. Since the wavelength band of maximum reflectance for Bragg gratings can change over time, failure to stabilize the grating wavelength can cause the optical source locked to the grating to undesirably drift with the grating, risking interference with adjacent channels. As a result, Bragg gratings must be maintained in a controlled thermal environment. The amount of wavelength shift depends partly upon the material properties of the fiber in which the Bragg grating is written. Moreover, since all materials are subject to temperature expansion, the problems associated with maintaining stability are not limited to Bragg grating modulators.

Conventional control techniques for overcoming the above stability problems are generally ineffective. In particular, Bragg gratings are typically controlled with temperature sensing and thermoelectric feedback or piezoelectric devices, both of which are prone to drifting out of calibration. For example, thermoelectric feedback has been utilized to stabilize the wavelengths of the Bragg gratings which are used as wavelength references for source lasers. Temperature-controlled modulators, however, tend to be inaccurate and slow. Moreover, piezoelectric devices have a narrow dynamic range and also tend to drift with temperature.

What is needed therefore is an accurate and direct apparatus and method for providing servo control to optical devices.

SUMMARY OF THE INVENTION

The preceding and other shortcomings of the prior art are addressed and overcome by the present invention which provides, in a first aspect, an apparatus for providing control for a signal processor having a plurality of taps, with each tap having a tap value, including a modulator for modulating each of the tap values with an attenuated unique code modulation such that the amplitude of the code set is less than the tap value to generate a modulated tap value, a summer for summing each of said modulated tap values to generate an aggregate tap value signal, a detector for receiving said aggregate tap value signal and match filter for distinguishing the tap values from each other utilizing the unique code for each tap value, thereby establishing simultaneous control for the plurality of taps while maintaining independence between the tap values and generating a filtered tap value signal, a demodulator for demodulating the filtered tap value signal generating a demodulated tap value error signal and means for adding the demodulated tap value error signal to the tap value for each tap, thereby providing servo loop control for each tap.

In another aspect, the present invention provides a method for providing control for a signal processor having a plurality of taps, with each tap having a tap value signal, including the steps of modulating each of the tap value signals with an attenuated unique code modulation such that the amplitude of the code modulation is less than the tap value signal to generate a modulated tap value signal, summing each of the modulated tap value signals to generate an aggregate tap value signal, detecting the aggregate tap value signal, distinguishing the tap values from another utilizing the unique code for each tap value, thereby establishing simultaneous control for the plurality of taps while maintaining independence between the tap values and generating a filtered tap value signal, demodulating the filtered tap value error signal to generate a demodulated tap value error signal and adding the demodulated tap value signal to the tap value for each tap, thereby providing servo loop control for the tap.

The foregoing and additional features and advantages of this invention will become apparent from the detailed description and accompanying drawing figures below. In the figures and the written description, numerals indicate the various features of the invention, like numerals referring to like features throughout both the drawing figures and the written description.

DETAILED DESCRIPTION OF THE PREFERRED EMBODIMENTS

Figure 1:
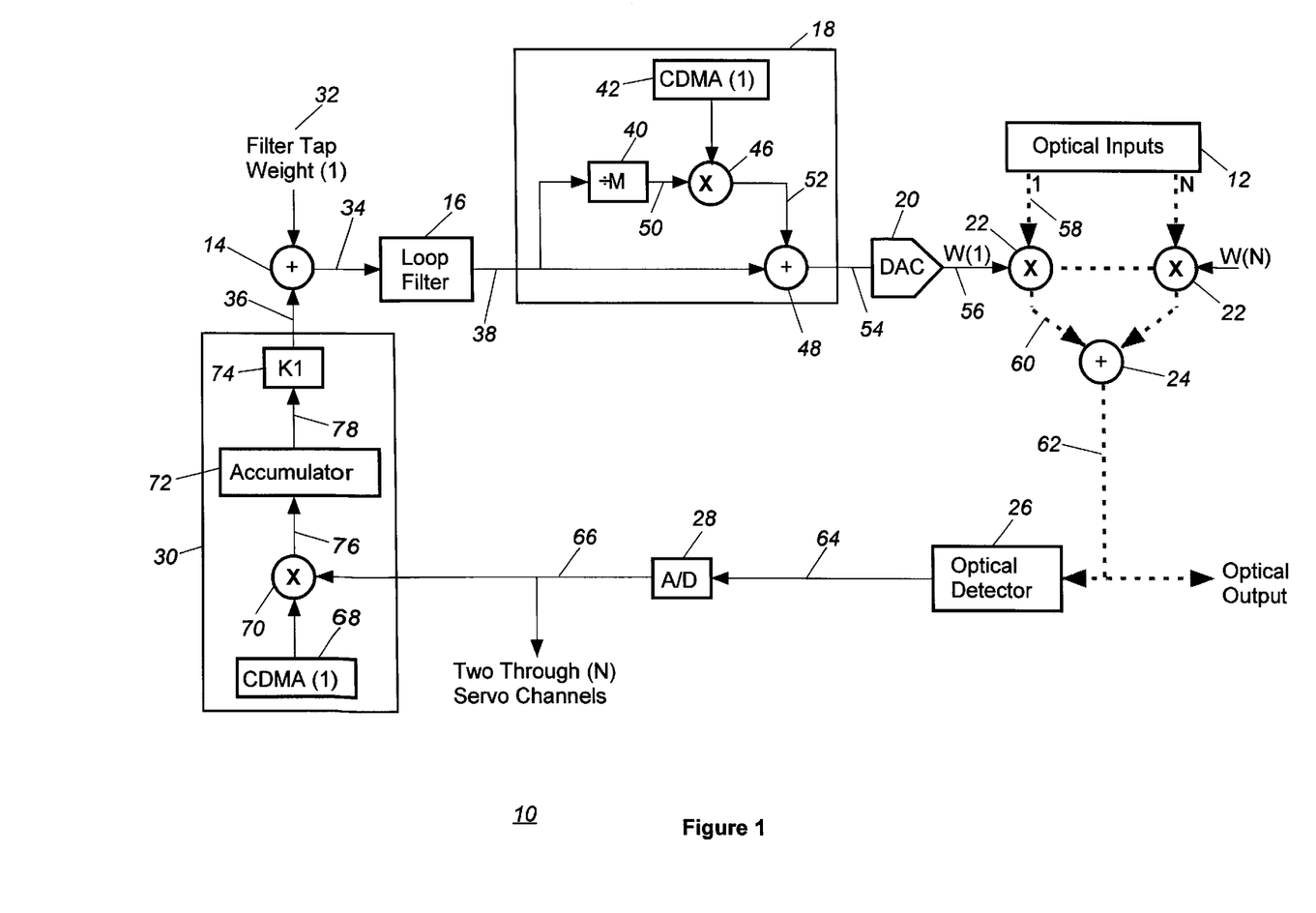
FIG. 1 is a block diagram of an orthogonal pilot tone servo controller for providing servo loop control in accordance with the preferred embodiment of the present invention.

Referring to FIG. 1, an orthogonal pilot tone servo controller 10 for providing servo loop control for each of the taps in a delay line signal processor 12 is illustrated. As described in detail, each servo acquires its independence from the other tap's servos utilizing an orthogonal code modulated on top of an existing tap value. The orthogonal code modulations are attenuated in amplitude such that the code modulations are transparent to the processed signals of interest, but the code's length enables each tap's feedback signal to be independently recovered from the aggregate of signals and codes through processing gain realized in each loop's recovery circuit. A plurality of taps can thus be servo controlled simultaneously, providing for extremely wide bandwidth processes which can be performed accurately with digital controls. Rather than depending on a calibrated relationship between temperature and modulator tap value over time and temperature or some other indirect relationship, the present invention provides a direct method for servo thus providing exact feedback solutions. Consequently, fast, accurate, stable and high performance modulator tap control is realized.

In a general aspect, the present invention provides a method for providing closed loop control for a control system consisting of a multiplicity of actuators or other controlled entities, each actuator or entity having a value, position, or output signal, including the steps of modulating each of the signals with an attenuated unique code modulation such that the amplitude of the code modulation is less than the signal to generate a modulated signal, summing each of the modulated signals to generate an aggregate signal, detecting the aggregate signal, distinguishing each signal from the others in the aggregate signal utilizing the unique code for each signal, thereby establishing simultaneous control for the plurality of actuators or other controlled entities which maintaining independence between the signals and generating a filtered signal, demodulating the filtered signal to generate a demodulated error signal to the signal for each actuator or controlled entity, thereby providing servo loop control for the actuator or controlled entity. For example, the present invention can be utilized to provide servo control to elements in a phased array antenna, or other complex positioning systems such as robotic controls. The present invention can also be utilized to provide servo control for adaptive FIR filters or IIR filters which can be integrated in high speed communications data links, wide band local area networks, modems and wide band filtering and adaptive equalization devices. The present invention is particularly useful for providing control to conventional or newly-developed semiconductor optical components, such as semiconductor lasers utilizing Bragg gratings for wavelength selection.

Referring to FIG. 1, the orthogonal pilot tone servo controller 10 is utilized to provide servo control for the N-tap delay line of an optical device 12, such as an adaptive filter, specifically an N-tap FIR filter having adjustable tap weights. In particular, the orthogonal pilot tone servo controller 10 generates a set of corrected tap weights for the optical device 12. The signal from each tap is individually adjusted (attenuated or amplified) such that, when brought together in a summer 24, the composite optical signal processor possesses the desired frequency response between the input to the optical processor and the output of the optical processor. The signal processors and processing can be automatically adjusted with electronically variable amplifiers in the taps or by other conventional or newly developed means.

As is illustrated in FIG. 1, the orthogonal pilot tone servo controller 10 for the optical processor includes a summer 14, loop filter 16, modulator 18, digital to analog controller (DAC) 20, mixers 22, optical summer 24, optical detector 26, analog to digital converter (A/D) 28 and demodulator 30. The solid path lines in FIG. 1 represent the electrical pathways while the dashed lines represent optical pathways. Although for exemplary purposes the orthogonal tone pilot servo controller 10 is shown providing servo control for a single tap, the present invention may be utilized to provide servo control for each tap in the delay line of the optical processor 12. As is well known in the art, each tap in the N-tap delay line of an optical component, such as a FIR filter, is assigned a value commonly referred to as the filter tap weight 32. The value assigned to each tap is generally dependent on the filtering characteristics desired and is generally supplied by a computer control interface (not shown).

Referring to FIG. 1, a filter tap weight error signal 34, comprised of a filter tap weight 32 and demodulated tap weight signal 36 which have been combined in the summer 14, is applied to the loop filter 16. The loop filter 16 optimizes the closed loop transfer function of the servo and removes any unwanted signals or harmonics. The filter tap weight signal 38 at the output of the loop filter 16 is applied to the orthogonal code modulator 18 which modulates the filter tap weight signal 38 with a unique code from an orthogonal code set.

Each tap's servo acquires its independence from the other tap's servos utilizing a unique orthogonal code modulated on top of the existing tap value or signal. The modulator 18 includes a scalar 40, coder 42, mixer 46 and adder 48. The filter tap weight signal 38 is initially attenuated by a scalar 40 which divides the filter tap weight signal 38 by a scaling constant M, thus allowing the filter tap weight signal 38 to be code modulated at a desired amplitude. The value of the proportionality constant M may be determined in accordance with numerous factors, including but not limited to, a value which would maintain the amplitude of the modulated signal small in comparison to the processed signals of interest and minimize the impact of any dither on the processed signals of interest. The resultant orthogonal code modulations are thus preferably attenuated in amplitude such that the code modulations are transparent to the processed signals of interest.

The scaled filter tap weight signal 50 is then multiplied with the desired orthogonal code via mixer 46. The code is generated by the coder 46, preferably an orthogonal code division multiple access (CDMA) coder 42. The code sequences provided by the CDMA coder 42 are preferably orthogonal, with zero or near zero cross-correlation. For example, orthogonal codes such as Gold or Walsh codes may be utilized.

The coded filter tap weight signal 52 is added to the filter tap weight signal 38 via the summer 48 to generate a modulated filter tap weight signal 54 modulated by the orthogonal code set as described above. The orthogonal code set of several thousand chips (e.g., 2047) is transparent to the filtered tap weight signal of interest, but the code's length enables each tap's feedback signal independent recovery from the aggregate of signals and codes through processing gain realized in each loop's recovery circuit. A plurality of taps can thus be servoed simultaneously. The DAC 20 converts each digital modulated filter tap weight signal 54 to an analog modulated tap weight signal W(1) 56, which is then multiplied with the respective optical input 58 via mixer 22.

In particular, the optical input 58 is coupled from a delay line having N multiple taps, shown as the optical inputs in FIG. 1. Each of the N number of taps is multiplied in mixer 22 by the corresponding modulated tap weight signal W(1) through W(N) and summed together by the summer 24. A weight is thus set on a tap and maintained over time and temperature for the N number of taps in the optical signal processor 12. The modulated filter tap weight signals 60 are summed together into one aggregate signal 62 at the summer 24 and applied to a single downstream optical detector 26.

The optical detector 26 converts the optical aggregate signal 62 into a detected signal 64. The A/D converter 28 converts the detected signal 64 to a digital signal 66. The digital signal 66 is applied to each tap's servo controller. FIG. 1 shows the servo controller for tap 1 only. In each tap's servo controller, the digital signal 66 is applied to the demodulator 30, which correlates the digital signal 66 with the corresponding orthogonal CDMA code used to modulate the tap of interest thereby distinguishing each filter tap weight signal within the aggregate digital signal 66 from each other. In particular, each code's length will enable each tap's servo controller to independently recover the tap's feedback signal from the aggregate of signals and codes through processing gain realized in each loop's recovery circuit. The present invention thus establishes simultaneous control while maintaining independence between the filter tap weight signals. Independence is achieved by modulating each tap with a code, preferably an orthogonal code having zero cross correlation characteristics as described above, which can be independently detected and servoed. To determine the status of each tap, each one of the codes can subsequently be filtered independently.

The demodulator 30 includes a corresponding CDMA coder 68 for correlation, mixer 70, accumulator 72 and scalar 74. The digital signal 66 is multiplied with the coder 68 via the mixer 70. The demodulated tap weight signal 76 at the output of the mixer 70 is applied to the accumulator 72, which accumulate each chip of the particular code for tap N thereby providing the necessary processing gain to extract the state of tap N. The demodulated tap weight signal 78 is then applied to a constant of proportionality 74, which adjusts the signal 78 by a constant factor K. The adjustment factor K, is used to relate the different loop gains which occur during detection and insertion loss which occurs over different parts of the system. The demodulated tap weight signal 36 is then applied to the summer 14, thereby completing the closed servo control loop.

Figure 2:
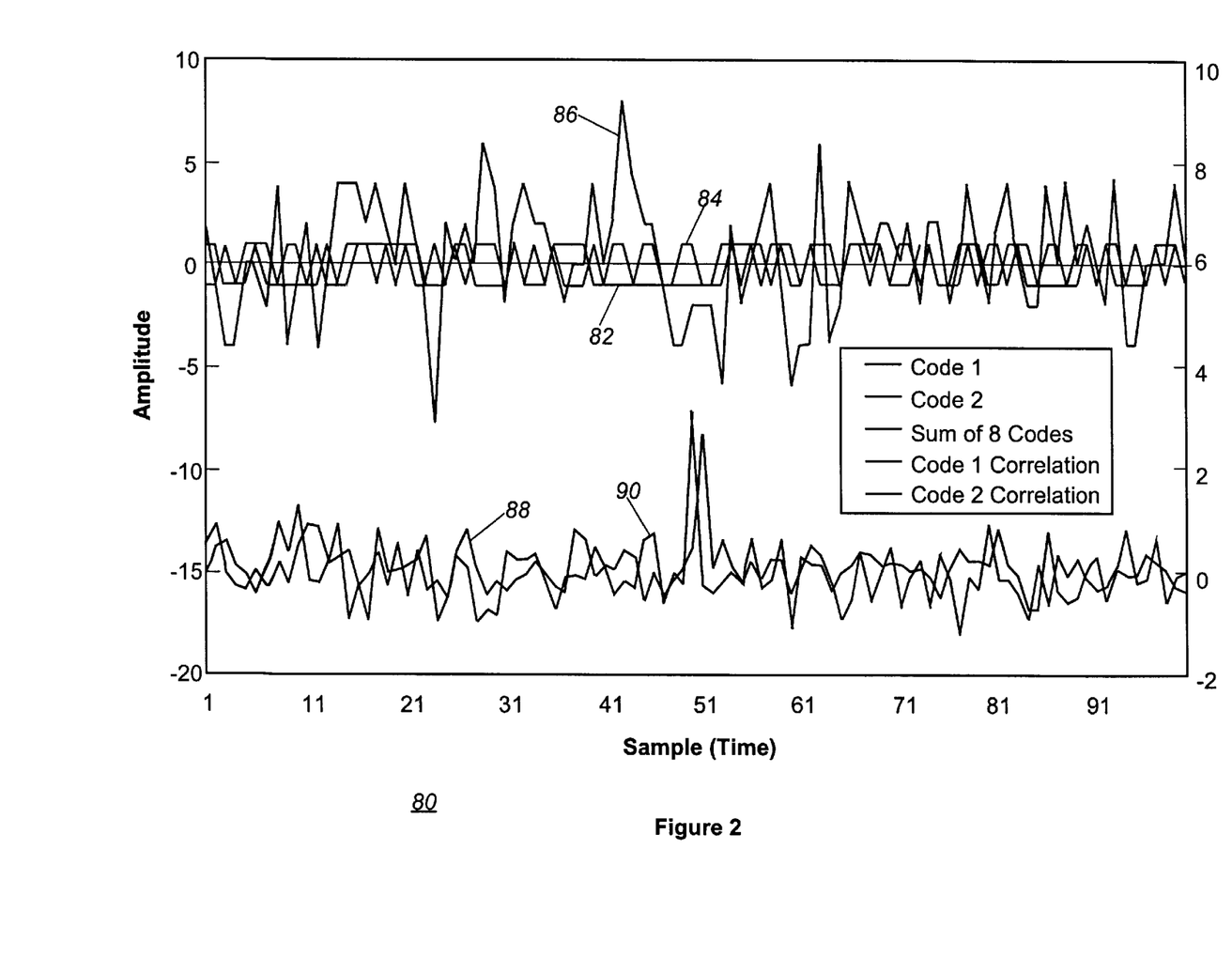
FIG. 2 is a graph of orthogonal code signals which may be utilized in the orthogonal pilot tone servo controller illustrated in FIG. 1.

In accordance with the present invention, each one of the taps in the delay line is modulated with an orthogonal code, summed together at the optical detector and filtered back out. Referring to FIG. 2, a simulation graph 80 of orthogonal code signals in the orthogonal pilot tone servo controller 10 is illustrated. In particular, the top traces show individual first and second codes 82 and 84, respectively, plotted on top of one another. A plot showing the summation of eight codes 86 (including the first and second codes) in accordance with the present invention is also illustrated. The bottom traces shows the auto correlation signals 88 and 90 of the first and second code, respectively. Thus, even though they are all summed together, each one of the codes can be filtered independently out to determine the status of each tap. Because the taps are modulated with unique orthogonal codes, the taps can be distinguished from one another during the servo process, thereby establishing efficient and simultaneous servo control while maintaining independence between the servo channels.

Figure 3:
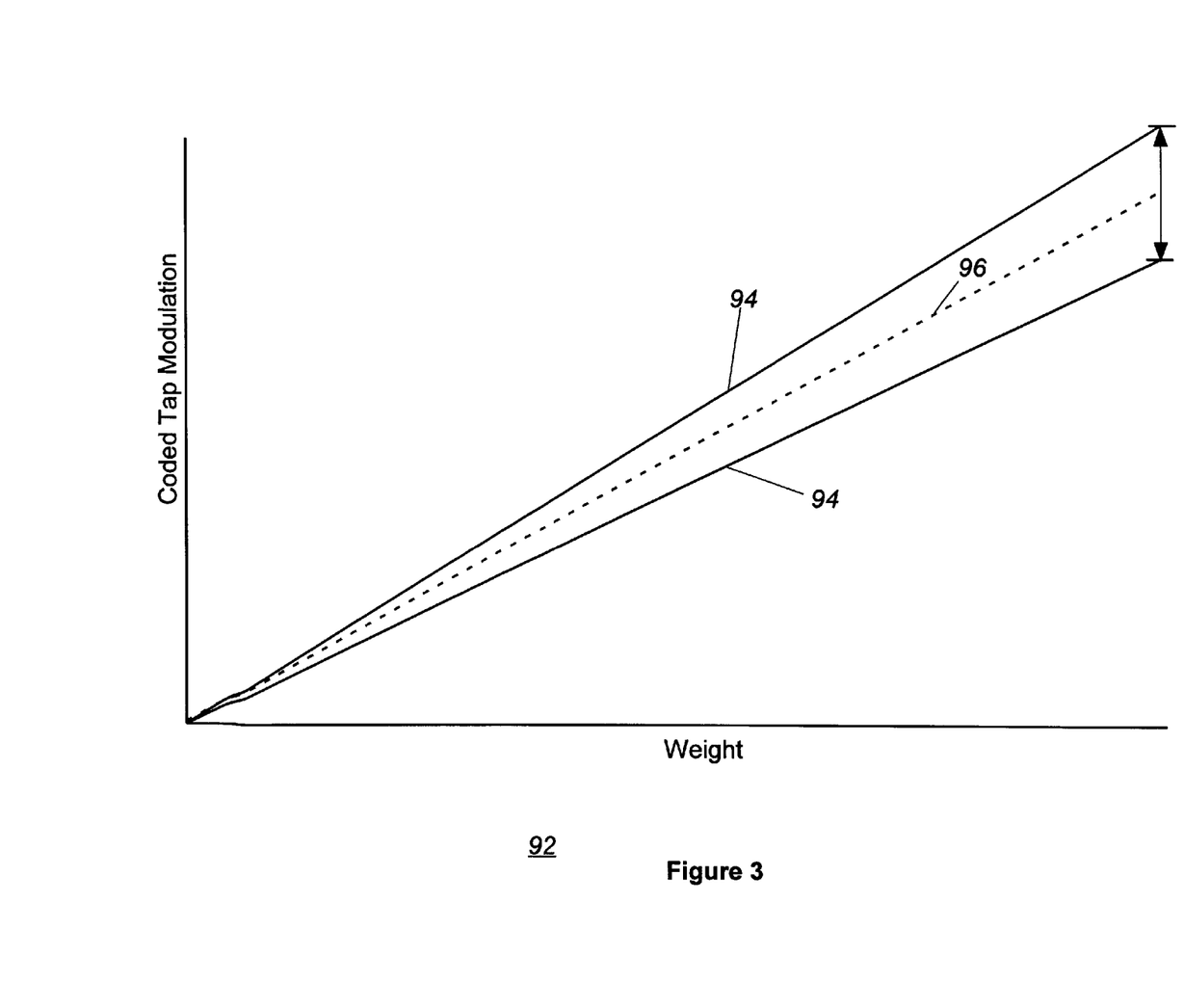
FIG. 3 is a graph of a coded tap modulation envelope in accordance with the present invention.

Referring to FIG. 3, a graph 92 of a coded tap modulation envelope 94 is illustrated. The two solid lines represent the coded tap modulation envelope 94 while the dashed lines represent the desired tap weight 96. Referring to FIGS. 1 and 3, as the particular tap weight is increased, the scaling constant M can be utilized to maintain the amplitude of the modulated signal small in comparison to the processed signals of interest. The coded tap modulation envelope 94 is a continuously increasing envelope which is a function of the weight per tap. The present invention utilizes an orthogonal CDMA code to realize one optical coefficient from another. While the CDMA code modulation allows one optical tap to be independently sorted from another, the amplitude modulation allows the state of that particular tap to be derived, thus giving the value at which the tap is set and providing the necessary feedback signal for that tap's servo controller.

Figure 4:
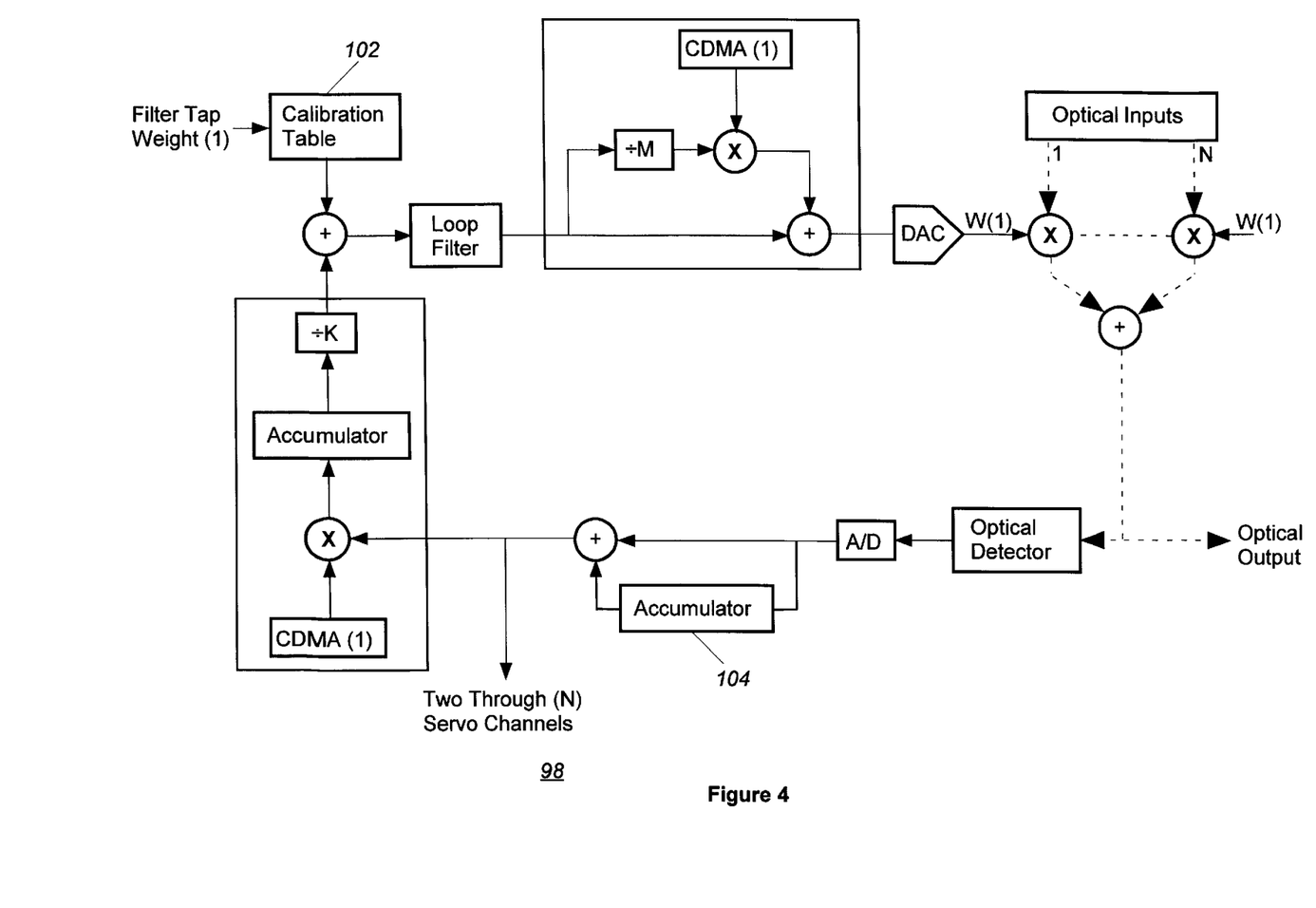
FIG. 4 is a block diagram of a orthogonal pilot tone servo controller for providing servo loop control in accordance with an alternative embodiment of the present invention.

Referring to FIG. 4, in accordance with another embodiment of the invention, an orthogonal pilot tone servo controller 98, having similar components and operation as the controller 10 shown in FIG. 1 except for the inclusion of a calibration table 102 and accumulator 104, is shown. The calibration table 102 provides calibrated values for non-linear inputs and stores values of weights for achieving a desired transform. For example, the weight values for an equalizer or filter can be stored in the calibration table 102 such that the values can be retrieved from the table as with conventional preprogrammed filters. The orthogonal pilot tone servo controller 100 can also alternatively include an accumulator 104 for filtering the aggregate signal.

Figure 5A:
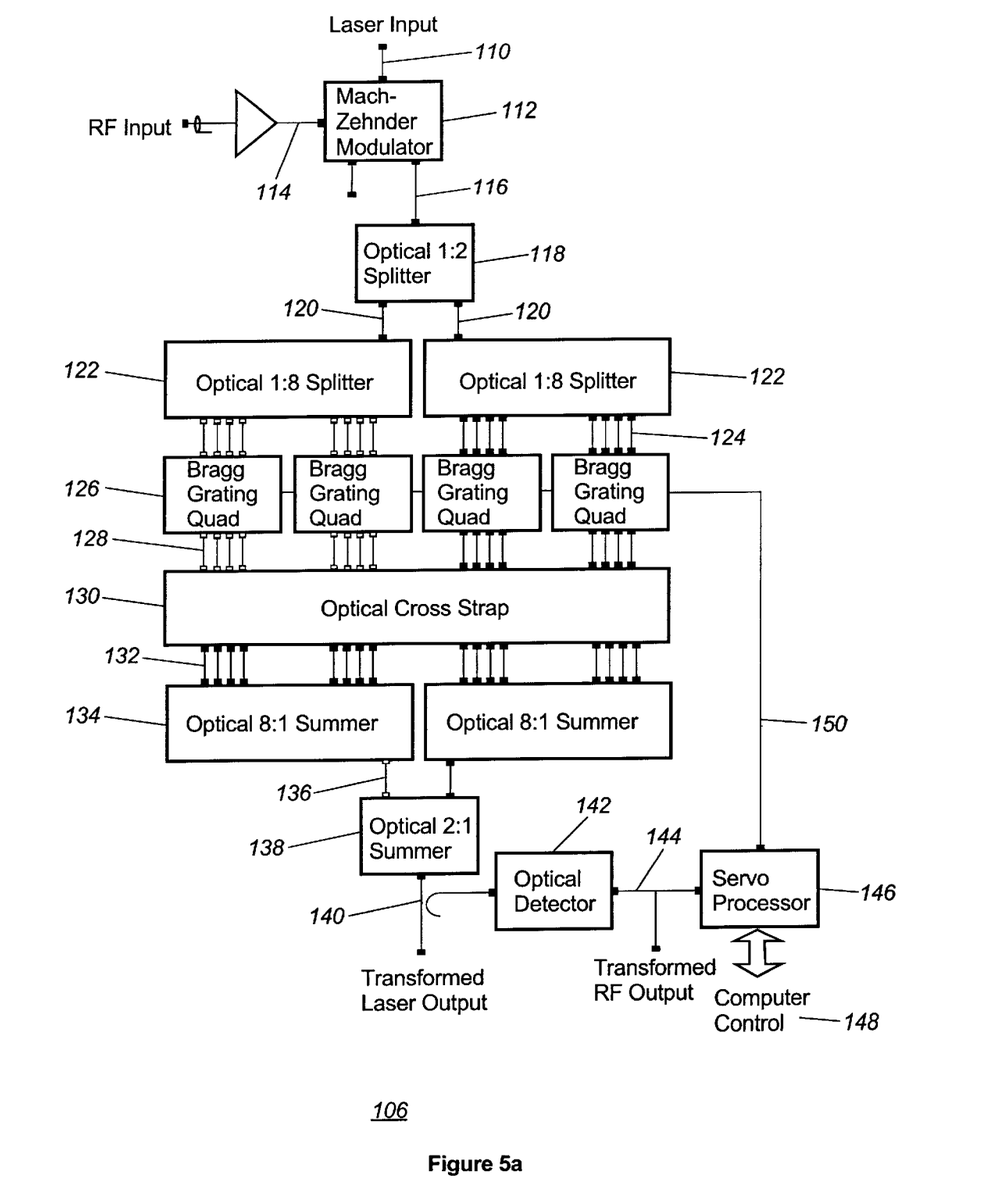
FIG. 5(a) is a block diagram of a photonics signal processing modulator including the orthogonal pilot tone servo controller illustrated in FIG. 1 in accordance with the present invention.
Figure 5B:
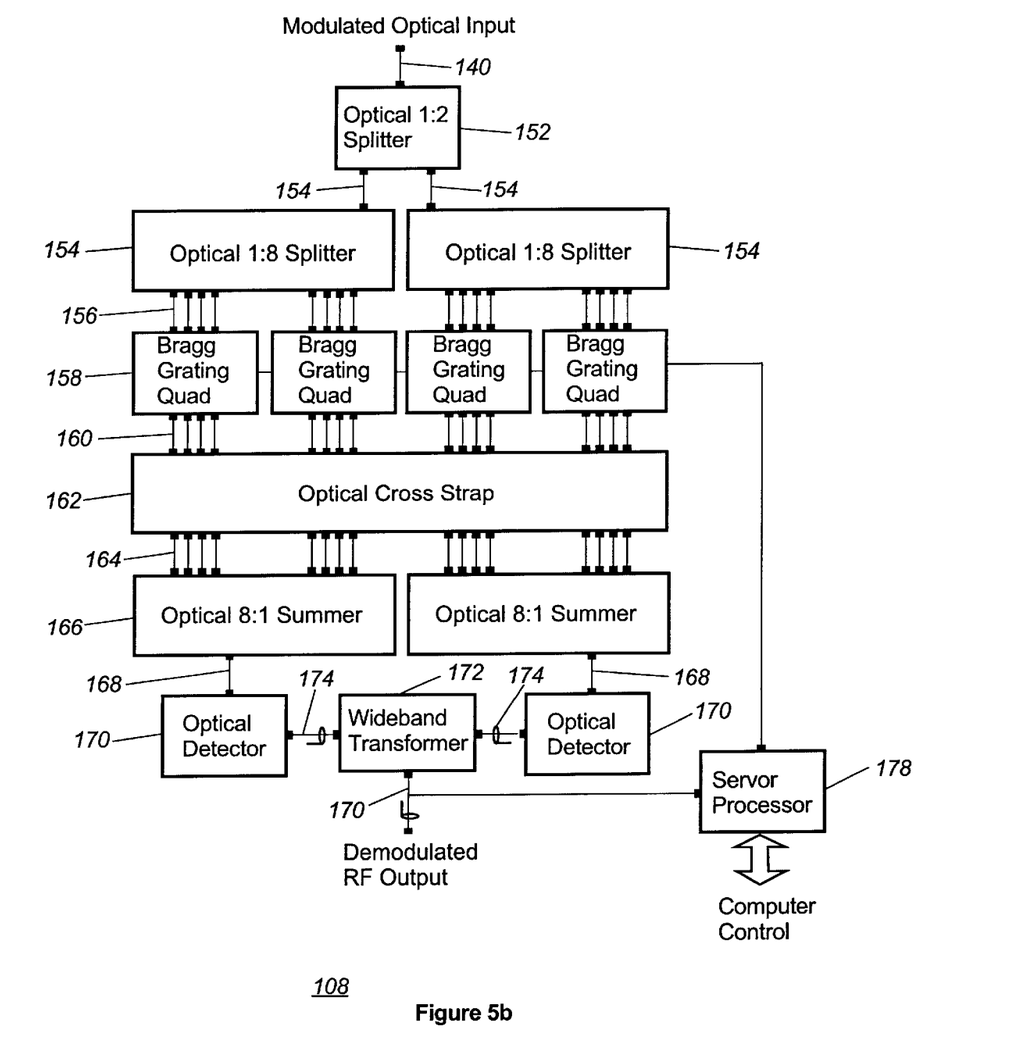
FIG. 5(b) is a block diagram of a photonics signal processing demodulator including the orthogonal pilot tone servo controller illustrated in FIG. 1 in accordance with the present invention.

Referring to FIG. 5(a), a photonics modulator system 106 utilizing the orthogonal pilot tone servo controller 10 illustrated in FIG. 1 is shown. The corresponding demodulator 108 is illustrated in FIG. 5(b). Referring to FIG. 5(a), an incoming optical carrier signal 110 from a laser source (not shown), such as a semiconductor laser, is initially applied to a Mach-Zehnder modulator 112 which modulates the optical carrier signal with an RF input signal 114. The Mach-Zehnder modulator 112 may be a commercially available modulator, such as Model No. YB 150-120-T-1-3-C-det-4, available from Uniphase Telecommunication Products of Bloomfield, Conn.

The modulated signal 116 is then applied to an 1×2 optical splitter 118 which places a portion of the modulated signal 116 onto two output paths 120. Each output path 120 optically communicates with an 1×8 optical splitter 122, which each places a portion of the split signal onto eight output paths 124. The optical splitters 118 and 122 may be selected from any optical device which can divide an input optical signal and place it onto plural output paths. For example, optical splitters which may be utilized include 1×2 wideband single mode splitters available under Model No. SM-1×2-M-250 and 1×8 wideband single mode splitters under Model No. SM-1×8-M-8R, both models of which are available from Photonic Integration Research, Inc. of Columbus, Ohio.

Each output path 124 optically communicates with a Bragg grating quad 126 which reflects the selected wavelength and transmits all other wavelengths. The Bragg grating quad 126 generally includes a series of photoinduced refractive index perturbations in an optical fiber which causes the reflection of optical signals within a selected wavelength band. The grating wavelength of maximum reflectivity is selected for each one of the incident optical inputs. In an exemplary embodiment, the orthogonal pilot tone servo controller 10 shown in FIG. 1, is utilized to provide servo control to the Bragg grating quads 126 such that the grating wavelength locks to a desired wavelength for each of the optical input. In particular, the output 128 of the Bragg grating quads, signals 1 through N, is applied to an optical cross strap 130, which interconnects the signals 128 in different desired configurations and lengths. The signals 132 output from the optical cross strap 130 are brought together in 8×1 optical summers 134 whose output 136 is applied to a 2×1 optical summer 138 . The 8×1 and 2×1 optical summers 134 and 138, respectively, may be any optical component which combines plural wavelengths into a single optical medium. The optical splitters 118 and 122 described above, operated in reverse fashion such that the splitters function as combiners, may be utilized.

An optical detector 142 measures the transformed laser output 140 which is transmitted from the gratings 126 via the optical cross strap 130 and summers 134 and 138 and converts the transformed laser output 140 to an electrical signal, the transformed RF output signal 144. The transformed RF output signal 144 is the modulated RF input. It is also applied to the servo processor 146, which utilizes the concepts of the orthogonal pilot tone servo controller 10 illustrated in FIG. 1 and described above to provide servo control to the Bragg grating quads 126. A computer control interface 148 provides the tap factors to be adjusted in accordance with FIG. 1. Although illustrated as a single path 150, the servo path from the servo processor to the Bragg grating quads 126 corresponds to inputs W(1) through W(N) in FIG. 1. The single path line 150 thus actually represents 16 path lines in the configuration shown in FIG. 5(*a*).

In accordance with the present invention, each one of the taps corresponding to the 16 path lines is modulated with an attenuated orthogonal code, summed together in summers 134 and 138 and detected by an optical detector 142 and filtered back out. Even though they are all summed together, each one of the codes can be independently filtered out to determine the status of each tap. Because the taps are modulated with unique orthogonal codes, the taps can be distinguished from one another during the servo process, thereby establishing efficient and simultaneous servo control while maintaining independence through the servo channels.

The servo control provided by the present invention can be utilized to modify the Bragg grating's reflection wavelength band in accordance with the wavelength of an incident optical input generating the transformed laser output. In particular, a control signal responsive to the electrical signals received from the optical detector is sent to the Bragg grating wavelength control system inside the Bragg grating quad by path line 150. The control signal modifies the grating wavelength band of high reflectivity.

Referring to FIG. 5(*b*), a demodulator 108 utilizing the concepts of the orthogonal pilot tone servo controller 10 of FIG. 1 is illustrated. In particular, the optically transformed laser output from the modulator 140 shown in FIG. 5(*a*) is applied to the demodulator 108 in FIG. 5(*b*) which performs the inversion of modulation (i.e. demodulation) by match filter detecting the waveform which is transmitted from the modulator 106.

In particular, referring to FIG. 5(*b*), the modulated optical input 140 is applied to the 1×2 optical splitter 150 which places a portion of the multiplexed signal onto two output paths 152. Each output path 152 optically communicates with 1×8 optical splitter 154 which places a portion of the split signal 154 onto eight output paths each 156. Each output path 156 optically communicates with one of the Bragg grating quads 158, the output 160 (signals 1 through N) of each of which is applied to the optical cross strap 162 for interconnecting the signals 160 in different configurations and different. The signals 164 output from the optical cross strap 162 are brought together in 8×1 optical summers 166. The output signal 168 from each 8×1 summer 166 is applied to an optical detector 170 for detecting each output signal 168. A transformer 172, preferably wide-band, is coupled to receive and combine the outputs 174 from each of the optical detectors 170. The output 176 from the transformer 172 is applied to the servo processor 178, which utilizes the concepts of the orthogonal pilot tone servo controller 10 illustrated in FIG. 1 and described above.

In accordance with an advantage of the present invention, the orthogonal pilot tone servo controller 10, regardless of whether it is connected in series or parallel, may be positioned virtually anywhere in a system to provide control, as long as there is a single detector, such as a diode detector, to distinguish the tap signals from one another. For example, the servo controller 10 can be used for adjusting the path amplitude, polarization, or length of an optical component. Each controller 10 would only require an orthogonal code set for modulating signals, a common single detector for detecting the aggregate, and a match filter for ferreting signals out from the aggregate detected signal and filtering the signals back for adjustment and control. The signals are ferreted out utilizing the orthogonal code set, in a manner that is independent of any other optical processing functions.

Furthermore, the present invention is also not limited by the architecture of the optical processor. For example, even for optical processors requiring more than one detector, such as in the case of processors including bipolar tap weights— necessitating the use of two different detectors, the implementation of the controller 10 of the present invention requires just a single detector. Moreover, existing diode detectors in a signal processing system can be utilized to provide detection in the controller 10, thereby minimizing the amount of hardware required.

The present invention can also take advantage of common mode rejection techniques to minimize errors. In particular, since all the signals are routed to a single detector, anything that is introduced as an error from the detector (e.g., an offset, gain, variance or drift) may be considered common mode and is rejected.

It will be appreciated by persons skilled in the art that the present invention is not limited to what has been shown and described hereinabove, nor the dimensions of sizes of the physical implementation described immediately above. The scope of invention is limited solely by the claims which follow.

What is claimed is:

1. An apparatus for providing control for a signal processor having a plurality of taps, with each tap having a tap value signal, comprising:

a modulator for modulating each of said tap value signals with an attenuated unique code such that the amplitude of said code is less than said tap value signal to generate a modulated tap value signal;

a summer for summing each of said modulated tap value signals to generate an aggregate tap value signal;

a match filter, responsive to said aggregate tap value signal, for distinguishing said tap values from each other utilizing said unique code set for each tap value;

a demodulator for demodulating said filtered tap value signal to generate a demodulated tap value signal; and means for adding said demodulated tap value signal to said tap value for each tap, thereby providing servo loop control for said tap.

2. The apparatus claimed in claim 1, wherein said unique code is part of an orthogonal code set.

3. The apparatus claimed in claim 2, wherein said orthogonal code set is an orthogonal CDMA code set.

4. The apparatus claimed in claim 3, wherein said orthogonal CDMA code set is a Gold code.

5. The apparatus claimed in claim 3, wherein said orthogonal CDMA code set is a Walsh code.

6. The apparatus claimed in claim 1, wherein said unique code is part of an approximately orthogonal code set.

7. The apparatus claimed in claim 1, wherein each unique code includes a code length which enables independent recovery of tap values from said aggregate tap value signal.

8. The apparatus claimed in claim 1, wherein said apparatus is utilized to provide servo control for each of the taps in a delay line signal processor.

9. The apparatus claimed in claim 1, wherein said apparatus is utilized to provide servo control for a FIR filter.

10. The apparatus claimed in claim 1, wherein said apparatus is utilized to provide servo control for a IRR filter.

11. The apparatus claimed in claim 1, wherein said apparatus is utilized to provide servo control for an adaptive filter.

12. The apparatus claimed in claim 1, wherein said apparatus is utilized to provide servo control for a Bragg grating modulator.

13. The apparatus claimed in claim 1, wherein said modulator for modulating each of said tap value signals with an attenuated unique code such that the amplitude of said code is less than said tap value signal to generate a modulated tap value signal further comprises:

a coder for providing said unique code to each of said tap value signals.

14. The apparatus claimed in claim 13, wherein said modulator for modulating each of said tap value signals with an attenuated unique code such that the amplitude of said code is less than said tap value signal to generate a modulated tap value signal further comprises:

a scalar for dividing each of said tap value signals by a constant value prior to said coder such that the amplitude of said code is less than said tap value signal.

15. The apparatus claimed in claim 1, wherein said demodulator for demodulating said detected tap value signal to generate a demodulated tap value signal further comprises:

a coder for correlating said detected tap value signal with said unique code set associated with said detected tap value signal.

16. The apparatus claimed in claim 15, wherein said demodulator for demodulating said detected tap value signal to generate a demodulated tap value signal further comprises:

an accumulator for accumulating chips within a code for processing the demodulated tap value signal out of the detected tap value signal.

17. The apparatus claimed in claim 16, wherein said demodulator for demodulating said detected tap value signal to generate a demodulated tap value signal further comprises:

a scalar for multiplying said demodulated tap value signal by a constant of proportionality neutralizing loop gain.

18. The apparatus claimed in claim 1, further comprising:

a loop filter, responsive to each of said tap value signals, for optimizing the closed loop transfer function of said servo control loop and removing any unwanted signals or harmonics from said tap value signals.

19. The apparatus claimed in claim 1, wherein said tap value signal is a filter tap weight.

20. A method for providing control for a signal processor having a plurality of taps, with each tap having a tap value signal, comprising the steps of:

modulating each of said tap value signals with an attenuated unique code such that the amplitude of said code is less than said tap value signal to generate a modulated tap value signal;

summing each of said modulated tap value signals to generate an aggregate tap value signal;

match filtering said aggregate tap value signal and distinguishing said tap values from each other utilizing said unique code for each tap value;

demodulating said detected tap value signal to generate a demodulated tap value signal; and adding said demodulated tap value signal to said tap value for each tap, thereby providing servo loop control for said tap.

21. The method claimed in claim 20, wherein said step of modulating each of said tap value signals with an attenuated unique code such that the amplitude of said code set is less than said tap value signal to generate a modulated tap value signal further comprises the step of:

modulating each of said tap value signals with an orthogonal code.

22. The method claimed in claim 21, wherein said step of modulating each of said tap value signals with an orthogonal code further comprises the step of:

modulating each of said tap value signals with an orthogonal CDMA code.

23. The method claimed in claim 22, wherein said step of modulating each of said tap value signals with an orthogonal CDMA code further comprises the step of:

modulating each of said tap value signals with said orthogonal CDMA code having a code length which enables independent recovery of tap values from said aggregate tap value signal.

24. The method claimed in claim 21, wherein said step of modulating each of said tap value signals with an orthogonal code further comprises the step of:

modulating each of said tap value signals with an approximately orthogonal CDMA code.

25. The method claimed in claim 20, further comprising the step of:

providing servo control to each of the taps in a delay line signal processor.

26. The method claimed in claim 20, further comprising the step of:

providing servo control to a FIR filter having an N-tap delay line.

27. The method claimed in claim 20 further comprising the step of:

providing servo control to an IIR filter having an N-tap delay line.

28. The method claimed in claim 20 further comprising the step of:

provinding servo control to a match filter having an N-tap delay line.

29. The method claimed in claim 20, further comprising the step of:

providing servo control to a Bragg grating modulator.

30. The method claimed in claim 20, wherein said step of modulating each of said tap value signals with an attenuated unique code such that the amplitude of said code is less than said tap value signal to generate a modulated tap value signal further comprises the step of:

providing a unique code to said tap value signal.

31. The method claimed in claim 30, wherein said step of modulating each of said tap value signals with an attenuated unique code such that the amplitude of said code is less than said tap value signal to generate a modulated tap value signal further comprises the step of:

dividing each of said tap value signals by a constant value prior to said coder such that the amplitude of said code is less than said tap value signal.

32. The method claimed in claim 20, wherein said step of demodulating said detected tap value signal to generate a demodulated tap value signal further comprises the step of:

code correlating said detected tap value signal with said unique code set associated with said detected tap value signal.

33. The method claimed in claim 32, wherein said step of demodulating said detected tap value signal to generate a demodulated tap value signal further comprises the step of:

accumulating chips of the code for filtering the said demodulated tap value signal out of the aggregate signal.

34. The method claimed in claim 33, wherein said step of demodulating said detected tap value signal to generate a demodulated tap value signal further comprises the step of:

multiplying said demodulated tap value signal by a constant value to normalize loop gain.

35. The method claimed in claim 20, further comprising the step of:

responsive to each of said tap value signals, filtering any unwanted signals or harmonics from said tap value signals.

* * * * *